B. MIDDLETON.
Hot-Bed.

No. 222,928. Patented Dec. 23, 1879.

WITNESSES:
Francis McArdle.
C. Sedgwick

INVENTOR:
B. Middleton
BY Munn & Co.
ATTORNEYS.

UNITED STATES PATENT OFFICE.

BENJAMIN MIDDLETON, OF MUSCATINE, IOWA.

IMPROVEMENT IN HOT-BEDS.

Specification forming part of Letters Patent No. 222,928, dated December 23, 1879; application filed October 16, 1879.

*To all whom it may concern:*

Be it known that I, BENJAMIN MIDDLETON, of Muscatine, in the county of Muscatine and State of Iowa, have invented a new and Improved Hot-Bed, of which the following is a specification.

Figure 1:
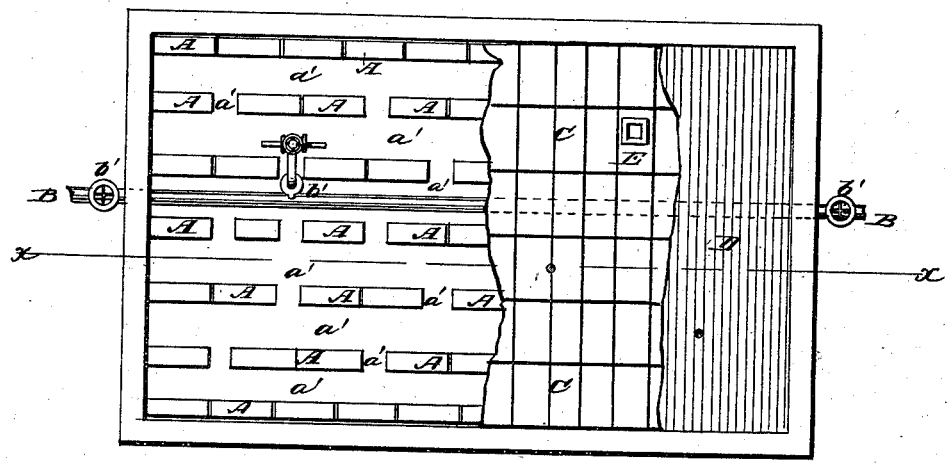
Figure 2:
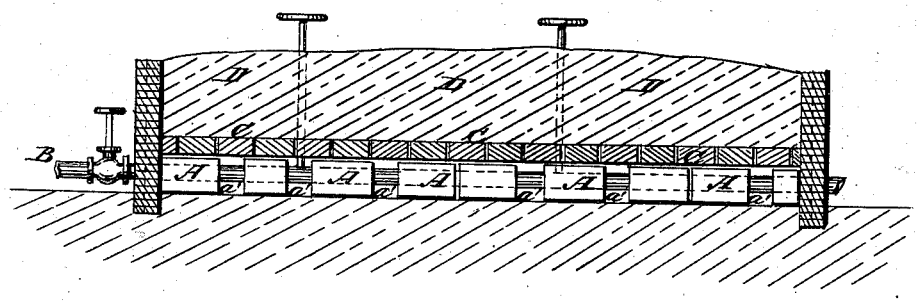

Figure 1 is a plan of the device, with some parts broken away to exhibit others. Fig. 2 is a sectional elevation of the same on line $x\,x$, Fig. 1.

Similar letters of reference indicate corresponding parts.

The object of this invention is a device for heating hot-beds, green-houses, and the like.

The invention consists in means for forcing heat and moisture to plants through an unvarying surface of porous bricks, tiles, or other equivalent substances, as hereinafter described.

In the drawings, A A represent the bricks or tiles set on edge, forming partitions, and $a'\,a'$ the passages between them. B represents a steam-pipe, provided with suitable cocks $b'\,b'$ and exits for steam, some of the handles for controlling the cocks being projected upward through the earth for convenience in regulating the temperature of the earth in the greenhouse or forcing-bed. C represents the floor, preferably of tile or brick, laid over the steam-passages, and D the earth laid upon the floor. E is an open conductor or flue, extending upward from the steam-passages for the insertion of a thermometer.

The steam entering the pipe B is permitted, by turning the cocks, to flow into the steam-passages $a'\,a'$, and impart its heat to the surrounding bricks or tiles, and thence into the superincumbent earth.

I am aware that there are devices for heating the earth in green-houses and forcing-beds, in which the earth is laid in and about hot-water or steam pipes; but in these devices the heat given off is unaccompanied with moisture, and great care must be had in controlling it lest the growing plants be injured.

By my device the moisture, as well as the heat of the steam, is imparted to the earth through the tiles or bricks beneath, and by this method of application the heat is much longer retained, and at the same time given off more gradually and at a more even temperature, and is more evenly distributed. It is also found that all plants thrive much better under the influence of the combined heat and moisture than under the influence of the heat given off by the usual steam or hot-water pipes, and that, in practice, less steam, and consequently less fuel, is by this process required for a given result in forcing plants than by any other process with which I am acquainted.

Having thus fully described my invention, I claim as new and desire to secure by Letters Patent—

1. As a means of heating the earth in forcing-beds and green-houses, the pipe B, in combination with the porous floor C and the partitions A, forming the passages $a'\,a'$, substantially as herein shown and described, whereby the earth placed upon the floor C may be heated and moistened by the admission of steam into the said passages, as herein set forth.

2. The partitions A A, steam-pipe B, provided with suitable cocks and steam-exits, and floor C, combined with each other, and arranged substantially as herein shown and for the purpose described.

3. The combination, with bricks A, having intermediate passages, $a'$, and the tile or brick floor C, of the open flue E, as and for the purpose specified.

BENJAMIN MIDDLETON.

Witnesses:
 CHARLES F. GARLOCK,
 DOUGLAS V. JACKSON.